United States Patent [19]

Mitchell

[11] Patent Number: 5,022,485
[45] Date of Patent: Jun. 11, 1991

[54] METHOD AND APPARATUS FOR DETONATION OF DISTRIBUTED CHARGES

[76] Inventor: Donald K. Mitchell, 915 E. Apache, Tulsa, Okla. 74106

[21] Appl. No.: 500,139

[22] Filed: Mar. 27, 1990

Related U.S. Application Data

[63] Continuation-in-part of Ser. No. 337,958, Apr. 13, 1989, Pat. No. 4,991,684.

[51] Int. Cl.$^5$ .......................... G01V 1/06; E21B 7/00; F42D 3/06
[52] U.S. Cl. .................................... 181/106; 181/116; 181/103; 175/4.55; 102/320
[58] Field of Search ............... 181/103, 106, 111, 116; 102/200, 320; 175/4.54, 4.55, 4.56

[56] References Cited

U.S. PATENT DOCUMENTS

| | | | |
|---|---|---|---|
| 3,100,444 | 8/1963 | Ball et al. | 181/116 |
| 3,126,964 | 6/1962 | LaRue | 175/4.55 |
| 3,246,708 | 4/1966 | Harrigan, Jr. et al. | 175/4.55 |
| 3,741,124 | 6/1973 | Visk | 102/220 |
| 3,768,408 | 10/1973 | Hallmark | 102/220 |
| 4,031,826 | 6/1977 | Gemmell et al. | 102/220 |
| 4,100,978 | 7/1978 | Boop | 175/4.55 |
| 4,208,966 | 8/1963 | Hart | 102/310 |
| 4,313,380 | 2/1982 | Martner et al. | 181/116 |
| 4,454,814 | 6/1984 | Henry et al. | 102/200 |
| 4,487,125 | 12/1984 | Zuk | 102/200 |
| 4,527,636 | 7/1985 | Bordon | 175/4.55 |
| 4,673,033 | 6/1987 | Minear et al. | 175/4.55 |
| 4,699,241 | 10/1987 | Kerekes | 181/116 |
| 4,895,218 | 1/1990 | Chen et al. | 181/116 |

FOREIGN PATENT DOCUMENTS

1817973  6/1962  Fed. Rep. of Germany .

Primary Examiner—Ian J. Lobo
Attorney, Agent, or Firm—Marger, Johnson

[57] ABSTRACT

A method and apparatus for geophysical exploration wherein a seismic wave is passed through a bore hole so at to sequentially detonate a plurality of explosive charges disposed within said bore hole at spaced intervals. A preselected seismic wave magnitude represented by a stored voltage is compared with signals generated by electro-acoustic sensors associated with each charge. When the magnitude of a seismic wave in the bore hole equals the preselected magnitude, a voltage stored on a capacitor discharges into a detonator. Means are provided for varying the stored voltage representing the preselected magnitude from the surface of the bore hole and for detonating any unexploded charges which may after the initial seismic wave passes through the bore hole. A firing circuit is armed substantially simultaneously with the initiation of the seismic wave in the bore hole. The firing circuit is armed for only approximately 0.1 to 0.5 seconds thereby preventing late detonation which destroys seismic data. The circuit may thereafter be rearmed to detonate any remaining unexploded charges in the bore hole.

20 Claims, 3 Drawing Sheets

METHOD AND APPARATUS FOR DETONATION OF DISTRIBUTED CHARGES

This application is a continuation-in-part application of U.S. application Ser. No. 07/337,958 filed in the U.S. Patent and Trademark Office on Apr. 13, 1989 now U.S. Pat. No. 4,991,684.

BACKGROUND OF THE INVENTION

1. Field of the Invention

The present invention relates to methods and apparatus of geophysical exploration and more particularly to such methods and apparatus wherein a plurality of explosive charges located at spaced intervals within a bore hole are sequentially detonated.

2. Description of the Related Art

In one method of seismic exploration, explosive charges are detonated in an underground formation and a recording of the pressure waves generated in the formation is made. Those knowledgeable in the interpretation of such pressure wave recordings can deduce information about the formation such as whether structures capable of trapping oil or gas are present.

One technique used for generating such pressure waves involves drilling a bore hole and distributing explosive charges at spaced intervals therein. The explosive charges are caused to detonate sequentially down the bore hole thereby creating a pressure wave which travels down the bore hole and which is reinforced by each successive explosion.

There are several known methods and apparatus for causing such sequential detonation of charges in a bore hole. In one such method and apparatus, each charge in the bore hole, except for the uppermost charge, is associated with a detonating circuit which includes a capacitor, an electro-acoustic sensor which generates a voltage in response to a pressure wave and a timer.

In operation, each of the detonating circuits is connected in parallel to a pair of wires which extend to the surface of the bore hole. Each capacitor is charged by applying a direct current voltage to the wires at the surface. The uppermost charge in the bore hole is detonated by a blaster in a conventional manner. The pressure wave so created strikes each sensor which in turn activates the associated timer. When a preselected timing period has passed, a circuit connection is made which causes the capacitor to discharge into the detonator thereby exploding the charge.

It would be desirable to provide a method and apparatus for sequentially detonating a plurality of charges in a bore hole in which the sensitivity of the sensor and its associated circuitry is adjustable. Premature detonation of the charges in response to background noise such as nearby drilling, transportation or construction may occur if the sensor and associated firing circuit is too sensitive. It would also be desirable to provide a pre-firing indication that the sensor will cause the detonator to explode in response to background noise. In the prior art, the only way the operator has of knowing whether or not background noise will cause premature detonation is to install the charges, detonators and related firing circuits in a bore hole, charge the capacitors in each detonating circuit and see whether or not one or more of the charges explodes. Such premature detonation prevents proper operation of the system, i.e., interferes with or prevents creation of a downwardly-directed pressure wave which is reinforced by successive explosions in the bore hole.

It would also be desirable to provide such a method and apparatus which is armed only very briefly just prior to explosion of the top charge in the bore hole in order to further minimize the possibility of premature detonation.

Sometimes, a pressure wave generated by a charge detonated at the top of the bore hole travels to the bottom thereof without detonating each of the charges distributed in the bore hole. Pressure waves generated by detonation of the distributed charges can cause detonation of the unexploded charges two to three seconds after the initial pressure wave. Such late explosions destroy the value of the seismic recordings and are thus undesirable. It would be advantageous for the firing circuits to be armed for a predetermined time which would typically fall between the 0.1 and 0.5 second range. Thus, in the event that a charge is not exploded by the initial pressure wave, subsequent pressure waves generated by reflections and/or detonation of distributed charges do not cause late detonation of unexploded charges.

Still, it may be undesirable to leave unexploded charges in the ground. Thus, it would be advantageous for any unexploded charges remaining in the ground to be first disarmed as described above to permit seismic recording without late detonation and, after completion of the seismic recording, to be rearmed and detonated so as not to leave unexploded charges in the ground.

In the event of equipment problems or unexpected sources of noise, such as nearby air or ground traffic, it would be desirable to remove the capacitor charging voltage of the surface without risk of charge detonation. When the prior art capacitor charging voltage is removed, the operator is left with a string of charges in the bore hole prepared to fire in response to a pressure wave.

As mentioned, prior art methods and apparatus include a pair of wires to which a direct current voltage is applied at the surface for charging the capacitor in each detonating circuit. It is important that the correct polarity voltage is applied to the wires to avoid premature detonation or damage to the circuit components which could leave a string of live charges in the hole without means for detonating them. It would thus be desirable if the voltage could be applied at the surface and the detonating circuits could be connected to the charging wires without regard for polarity.

SUMMARY OF THE INVENTION

An apparatus for firing an explosive charge in a formation so as to reinforce a pressure wave passing through the formation includes a firing circuit connectable to the charge. Means are provided for triggering the firing circuit so as to fire the charge when the pressure wave magnitude substantially equals a preselected pressure wave magnitude.

The invention also includes a method of firing an explosive charge in a formation so as to reinforce the pressure wave passing therethrough and includes the step of connecting a firing circuit to the explosive charge. The charge is positioned in the formation and a pressure wave magnitude is preselected. A pressure wave is generated in the formation and the firing circuit is triggered so as to fire the charge when the pressure wave magnitude substantially equals the preselected pressure wave magnitude.

It is a general object of the present invention to provide an improved method and apparatus for detonation of distributed charges which overcomes the above-enumerated disadvantages in the prior art.

It is a more specific object of the present invention to provide such a method and apparatus which can produce an indication at the surface of the bore hole of the level of background noise which will cause detonation of the charges.

It is another specific object of the present invention to provide such a method and apparatus in which the sensitivity can be adjusted.

It is an even more specific object of the present invention to provide such a method and apparatus in which the sensitivity can be adjusted from the surface while the charges are distributed in the bore hole.

It is yet another specific object of the present invention to provide such a method and apparatus in which capacitors in the detonating circuits associated with each charge can be charged from the surface without regard for polarity of the direct current charging voltage.

It is still another specific object of the present invention to provide such a method and apparatus which is armed, i.e., placed in condition for detonation of the charges responsive to a pressure wave, by removing the direct current charging voltage at the surface and which also provides means for removing such voltage without arming if so desired.

It is another object of the present invention to provide such a method and apparatus which is armed until just after the initial pressure wave in the bore hole passes thereby and is then disarmed to prevent late detonation.

It is another more specific object of the present invention to provide such a method and apparatus which is disarmed to prevent late detonation, and thereafter rearmed and caused to detonate any unexploded charges so that such charges are not left in the ground.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENTS

Figure 1:
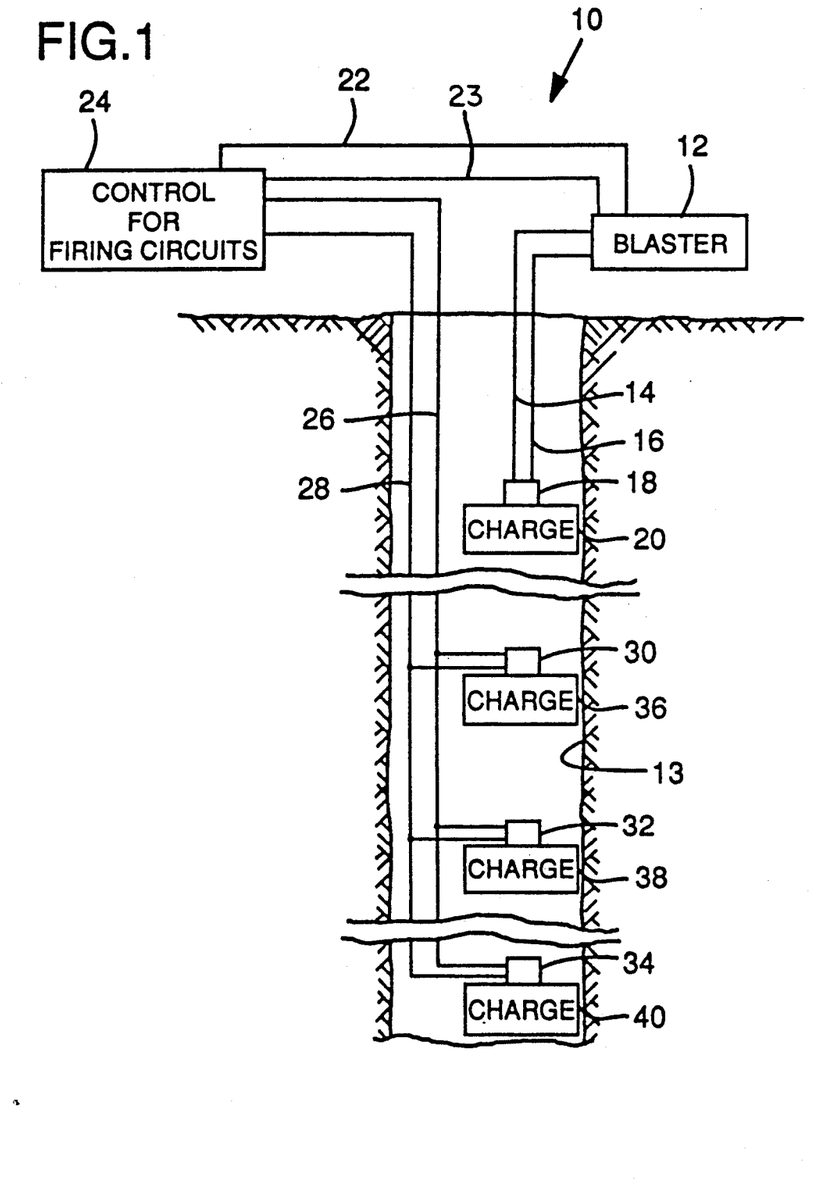
FIG. 1 is a diagrammatic view of a bore hole containing a plurality of explosive charges associated with apparatus constructed in accordance with the present invention.
Figure 2:
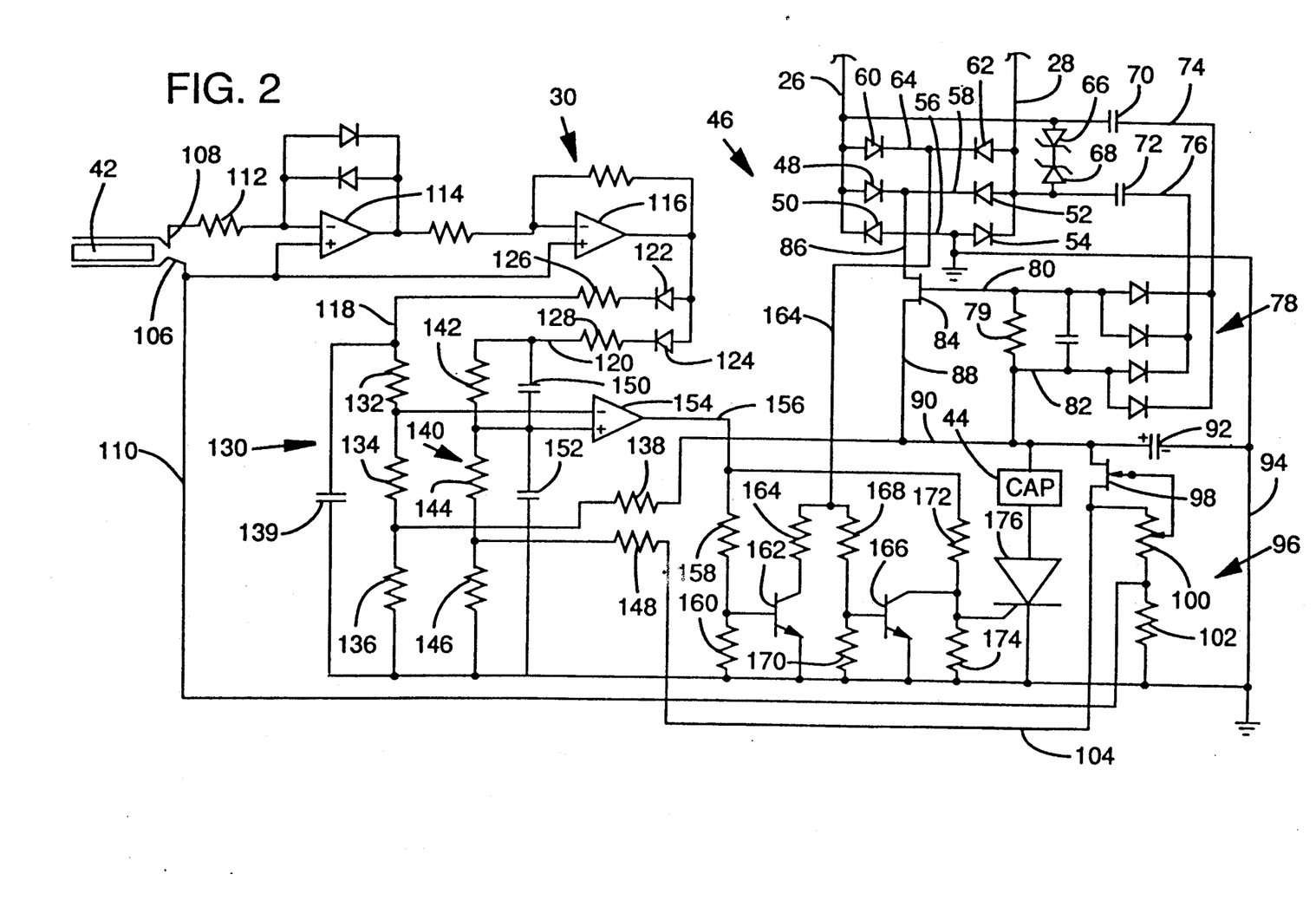
FIG. 2 is a schematic diagram of a firing circuit which is associated with each of the charges except for the uppermost charge in FIG. 1.

The Embodiment of FIGS. 1 and 2

Indicated generally at 10 is a preferred embodiment of an improved apparatus for detonation of distributed charges constructed in accordance with the present invention. Included therein is a commercially available blaster 12 which is connected via wires 14, 16 to a conventional detonator 18 suspended in a bore hole 13. The detonator is coupled to an explosive charge 20.

Blaster 12 is connected by wires 22, 23 to a control for firing circuits 24. Control 24 includes therein means for applying a direct current voltage which can be selectively varied between about 15 and 40 volts DC across wires 26, 28. Also included in control 24 is means for applying an AC voltage across wires 26, 28 simultaneously with the DC voltage. In the instant embodiment of the invention, the AC voltage is approximately 15 volts AC peak-to-peak at about 500 cycles per second. A meter (not visible) is mounted on control 24 to provide an indication of current flowing in wires 26, 28.

As will later be described in more detail, when blaster 12 is actuated, thereby exploding detonator 18 and its associated charge 20, a signal appears on wire 22 which causes control 24 to disconnect voltage applied across wires 26, 28. Control 24 is essentially a conventional AC generator connected in series with a conventional DC generator. Normally only the DC voltage is applied to wires 26, 28. A switch (not shown) is provided for selectively applying the AC voltage to deactivate the system, as will hereinafter be more fully described. Preferably, the AC and DC voltage generators in control 24 are conventional current-limited power supplies. A conventional SCR (not shown) is connected across the output of the supplies. The signal generated by blaster 12 when the same is actuated to explode charge 20 is applied to the gate of the SCR thereby shorting wires 26, 28.

Power is connected to control 24 via a conventional magnetic circuit breaker (not shown) which trips when the SCR fires and which must be manually reset before the control can again apply voltage to wires 26, 28.

It should be noted that in practice, such switching off of the voltage appearing on wires 26, 28 is not necessary since explosion of charge 20 severs wires 26, 28 thereby removing voltage applied to wires 26, 28 down hole from charge 20. This fact is known in the art as stated in Kerekes U.S. Pat. No. 4,699,241, column 3, line 54 as follows: "Through conventional connections to blaster 25, detonator 29 may be fired, initiating a pressure field whose down going wave form cuts charging wires 22 and 24."

Wires 26, 28 are connected to a plurality of firing circuits, such as firing circuits 30, 32, 34, which are suspended at preselected intervals in bore hole 13. Each firing circuit 30, 32, 34 is associated with an explosive charge 36, 38, 40, respectively. Firing circuits 30, 32, 34 are substantially identical to one another.

Before providing a detailed description of the structure of the firing circuits, like firing circuits 30, 32, 34, and the manner in which each interacts with the other components illustrated in FIG. 1, a brief general description of the function of the overall configuration of FIG. 1 follows. After the components are arranged as illustrated in FIG. 1, blaster 12 is actuated thereby exploding detonator 18 and its associated charge 20. Such actuation is typically accomplished by a remote radio transmitter. Simultaneously with the actuation of blaster 12, a signal on line 22 removes the voltage on wires 26, 28, thereby arming the firing circuits in a manner which will hereinafter be more fully described. The pressure wave created by the detonation of charge 20 travels down bore hole 13 causing detonation of each charge in the bore hole as the pressure wave passes thereby thus adding to the magnitude of the wave. The terms pressure wave, acoustic signal and seismic wave are all used herein to refer to the acoustic energy generated by detonation of a charge in the bore hole.

Turning attention now to FIG. 2, a detailed schematic diagram of firing circuit 30, including the connection to wires 26, 28, which retain the same numbers in FIG. 2, is illustrated therein. As mentioned, each of the other firing circuits suspended in the bore hole is substantially identical to firing circuit 30.

Included in firing circuit 30 is an electro-acoustic sensor or bimorph element 42. Firing circuit 30 is connected to a blasting cap or detonator 44 which is substantially identical to detonator 18. Cap 44 is attached to charge 36 (in FIG. 1) which is not shown in FIG. 2. Generally speaking, firing circuit 30 causes a current to flow through detonator 44 in response to an electric signal generated by bimorph element 42. The bimorph element produces such a signal responsive to a pressure wave in bore hole 13 which is generated by one or more previous explosions in the bore hole.

Considering in more detail the manner in which firing circuit 30 accomplishes this end, indicated generally at 46 is a full wave bridge rectifier made up of diodes 48, 50, 52, 54. The anodes of diodes 50, 54 are tied to the circuit ground via a conductor 56 while the cathodes of anodes 48, 52 are tied together via conductor 58. As will be recalled, a direct current voltage is applied across conductors 26, 28 at the surface of bore hole 13. Bridge 46 causes the positive side of this direct current voltage to always appear on conductor 58 while the negative side of the voltage appears on conductor 56 regardless of the polarity of the voltage applied to wires 26, 28.

Diodes 60, 62 have their cathodes tied to one another and to a conductor 64 while the anode of diode 60 is connected to conductor 26 with the anode of diode 62 being connected to conductor 28. As will be more fully explained hereinafter, diodes 60, 62 provide a path for current in conductor 64 which is measured at the surface of the bore hole.

Zener diodes 66, 68 are placed across lines 26, 28 and provide spike suppression of voltage appearing across wires 26, 28. Capacitors 70, 72 have one side connected to lines 26, 28, respectively, with the other side of capacitor 70 being connected to conductor 74 and the other side of capacitor 72 being connected to conductor 76. Capacitors 70, 72 couple an AC voltage which may be applied to wires 26, 28 at the surface of bore hole 13, to a full wave bridge rectifier indicated generally at 78. Rectifier 78 includes four diodes connected as shown, a resistor 79 and a filtering capacitor connected in parallel with resistor 79. The purpose of applying an AC voltage to wires 26, 28 at the surface of the bore hole will be explained in detail hereinafter. In any event, when such a voltage is applied, it is coupled, via capacitors 70, 72, to conductors 74, 76 and thus to rectifier 78. The rectifier produces a DC voltage on the output thereof with the negative side of the DC voltage appearing on conductor 80 and the positive side on conductor 82.

Conductor 80 is connected to the gate of a depletion mode field effect transistor (FET) 84. The drain of FET 84 is connected to a conductor 86 while the source is connected to conductor 88. For so long as no AC voltage is applied to wires 26, 28, and therefore no negative DC potential appears on conductor 80, FET 84 presents a very low resistance between its drain and source. Thus the positive DC voltage, which is applied to either wire 26 or wire 28, is applied via conductors 58, 86 to the drain of FET 84 and from there to conductor 88.

Conductor 88 is connected to a conductor 90 which is connected to, among other things, one side of a storage capacitor 92. The other side of the storage capacitor is connected via conductor 94 to ground. It can thus be seen that when a direct current voltage is applied across wires 26, 28, regardless of polarity, the positive side of the voltage is applied via rectifier 46, FET 84 (so long as it remains on) and conductor 90. The negative potential on the other of wires 26, 28 is applied through rectifier 46 and conductor 94 to the other side of capacitor 92.

Indicated generally at 96 is a power supply circuit incorporating a FET 98, a potentiometer 100 and a resistor 102. The drain of FET 98 is connected to conductor 90 with the source being connected to a conductor 104 which in turn is connected to, among other components, the top side of potentiometer 100. The wiper of the potentiometer is connected to the gate of FET 98 as shown. Potentiometer 100 is adjustable to produce a power supply voltage on conductor 104 which is regulated by FET 98. In the instant embodiment of the invention, the power supply voltage on conductor 104 is set at +15 volts DC. So long as the DC voltage applied across wires 26, 28 remains above 15 volts, FET 98 regulates the same to produce a +15 volt DC voltage on conductor 104.

Consideration will now be given to signals produced by bimorph element 42 and the components of firing circuit 30 which process the bimorph signal. Element 42 includes a pair of conductors 106, 108, which extend therefrom. Conductor 106 is connected to a conductor 110 while conductor 108 is connected to one side of resistor 112. The bimorph element is conventional and produces a voltage across conductors 106, 108 which is proportional to deformation of bimorph element 42. The container housing the bimorph element deforms the bimorph in response to a pressure wave generated by an explosive charge in the bore hole above firing circuit 30.

An operational amplifier 114 has a pair of diodes in its feedback path which causes the output thereof to produce a voltage substantially proportional to the logarithm of the input, i.e., the vibration detected by element 42. The positive reference terminal of amplifier 114 is connected to conductor 110 which in turn is connected to the junction between potentiometer 100 and resistor 102 in power supply 96. This picks off a positive constant DC voltage from the power supply for use as a reference voltage by amplifier 114.

The output of amplifier 114 is applied via a resistor as shown to the input of a linear operational amplifier 116. The positive reference terminal of amplifier 116 is also tied to conductor 110 and the output of amplifier 116 is simply an amplified version of the input thereof.

The output of amplifier 116 is applied to a pair of conductors 118, 120 via diodes 122, 124 and resistors 126, 128. In the present embodiment of firing circuit 30, resistors 126, 128 have substantially equal resistances.

Conductor 118 is connected to a resistive network, indicated generally at 130, made up of resistors 132, 134, 136, 138. Capacitor 139 has one end thereof connected to conductor 118 and the other end grounded as shown.

Conductor 120 is connected to a similar resistive network, indicated generally at 140, made up of resistors 142, 144, 146, 148. A pair of capacitors 150, 152 are connected in series between conductor 120 and ground with the juncture of capacitors 150, 152 being tied to the juncture of resistors 142, 144.

In the present embodiment of the invention, the resistances of resistors 132, 142 are substantially equal; the resistances of resistors 134, 144 are substantially equal; the resistances of resistors 136, 146 are substantially equal; and the resistances of resistors 138, 148 are substantially equal. It is to be appreciated that the foregoing relationships are preferable but that others are also usable in practicing the invention.

An operational amplifier 154 has its non-inverting input tied to the juncture of capacitors 150, 152, and its inverting input tied to the juncture of resistors 132, 134. Amplifier 154 operates in the usual manner in that when the magnitude of the voltage appearing on the non-inverting input exceeds the magnitude appearing on the inverting input, the output of amplifier 154, which is tied to conductor 156, produces a positive step voltage.

In the present embodiment of the invention, capacitance values for capacitors 139, 150, 152 are chosen so that the value of the voltage appearing on conductor 120 is substantially equal to the output of operational amplifier 116 while the value appearing on conductor 118 represents a smoothing of maximums over the past approximately 10 milliseconds of the output of operational amplifier 116. Thus, the voltage appearing on conductor 120 is proportional to the logarithm of vibrations sensed by element 42 while the voltage appearing on conductor 118 represents a short term average over time of such vibrations.

Conductor 156 is connected to resistors 158, 160 which are connected in series with the lower end of resistor 160 being grounded. The juncture of resistors 158, 160 is tied to the base of a transistor 162 which has its emitter grounded as shown and its collector connected to a resistor 164. A second transistor 166 has a base which is tied to the juncture of resistors 168, 170. The emitter of transistor 166 is grounded and the collector thereof is connected to the juncture of resistors 172, 174.

The juncture of resistors 164, 168 is connected by conductor 175 to the juncture of the cathodes of diodes 60, 62.

The gate of a silicon-controlled rectifier (SCR) 176 is tied to the juncture of resistors 172, 174. The anode of SCR 176 is connected to one side of blasting cap 44 with the other side thereof being tied to one side of capacitor 92.

In operation, a plurality of firing circuits, like firing circuit 30, are configured as shown in FIG. 2. Each firing circuit is then associated with a charge, like firing circuit 30 and charge 36, in such a manner that detonation of cap 44 causes the charge associated therewith to explode. As shown in FIG. 1, firing circuits 32, 34 are associated with charges 38, 40 respectively.

Charges are then disposed in a well bore, like well bore 13, as shown in FIG. 1. Wires 26, 28 are tied to the anodes of diodes 60, 62, in each of the firing circuits, as shown in FIG. 2. Wires 26, 28 are connected to control 24 at the surface of bore hole 13. The top charge in bore hole 13, charge 20, is associated with a conventional detonator 18 which is connected via wires 14, 16 to blaster 12. Conductor 22 is arranged to interconnect blaster 12 and control 24 as shown in FIG. 1.

After the various components are arranged as shown in FIG. 1, control 24 is operated to apply a DC voltage to wires 26, 28. Regardless of the polarity of the applied voltage, diodes 48, 52 cause the positive voltage to be applied to conductor 58 and the negative voltage to appear on conductor 56. This DC voltage, which as will be hereinafter more fully explained, can be varied to adjust the sensitivity of firing circuit 30 and is typically in the range of about 17 or 18 volts DC to about 40 volts DC.

Capacitors 70, 72, while coupling AC voltage to conductors 74, 76, do not transmit the DC voltage applied to wires 26, 28. Thus, bridge 78 does not produce an output on conductor 80 and the gate of FET 84 is at substantially the same potential as the source, which is tied to conductor 88, since the gate and source are coupled via resistor 79. With FET 84 so biased, the drain-source junction presents a resistance of only approximately 100 ohms, thus applying substantially all of the potential on conductor 86 to conductor 90 via conductor 88. Thus, capacitor 92 is charged to substantially the same potential as that appearing across wires 26, 28.

The charge across capacitor 92 also appears across power supply 96. The drain of FET 98, which is connected to conductor 90, has the positive side applied thereto while the lower end of resistor 102 is tied to ground. Potentiometer 100 can thus be used to selectively bias FET 98 to produce a substantially constant voltage, in the present embodiment of firing circuit 30 such equaling +15 volts DC, on the source of the FET so long as the voltage across capacitor 92 is somewhat larger than 15 volts DC. The power supply voltage is used to provide power to the various operational amplifiers in the circuit via the usual connections (not shown).

With a direct current voltage applied across wires 26, 28 as described, a positive voltage is applied to conductor 64 via diode 60 or diode 62 thus causing a positive voltage to appear at the juncture of resistors 168, 170 which biases transistor 166 to an "ON" condition, thereby shorting the gate of SCR 176 to ground and preventing firing thereof. SCR 176 is referred to herein as an electronic switch. The electronic switch, as well as the firing circuit, is described as having a disarmed condition which is the condition when transistor 166 is turned on thus preventing firing of SCR 176. The armed condition of SCR 176, and of the firing circuit, occurs when transistor 166 is off, thus permitting firing of SCR 176 responsive to a positive voltage appearing on the gate thereof.

When capacitor 92 is charged sufficiently to cause detonation of cap 44 when the capacitor discharges into the cap, firing circuit 30 is referred to herein as being in an activated condition. When capacitor 92 does not contain a sufficient charge to detonate the cap, it is referred to herein as being in a deactivated condition.

When firing circuit 30 is activated by application of a DC voltage to wires 26, 28, operational amplifiers 114, 116, 154 receive power from the power supply. Signals produced by bimorph element 42 as a result of what is referred to herein as background noise, are applied via amplifier 114, which, as will be recalled, produces an output proportional to the logarithm of displacement of element 42, and linear amplifier 116 to conductor 118 (via diode 122 and resistor 126). The output of amplifier 116 is also applied to conductor 120 via diode 124 and resistor 128. Background noise includes such vibrations of the bimorph element which may be produced as a result of nearby construction, passing trucks, drilling, etc. as well as noise inherent in firing circuit 30.

It can be seen that network 130 adds a constant percentage of the charge across capacitor 92 ($V_C$) to a constant percentage of the voltage appearing on conductor 118 ($V_{RC1}$) together at the juncture of resistors 132, 134 and applies the voltages so summed to the inverting input of amplifier 154. Similarly, a constant percentage of the regulated voltage ($V_R$), such being 15 volts DC in the present embodiment of the invention, is applied at the juncture of resistors 144, 146. This is summed with the voltage appearing on conductor 120 ($V_{RC2}$) which as will be recalled is proportional to the logarithm of the vibration detected by bimorph 42. The sum of the percentages of $V_R$ and $V_{RC2}$ appears at the juncture of resistors 142, 144 and is applied to the non-inverting input of amplifier 154. Thus, where A and B are constant percentages determined by the values of the resistances in resistive networks 130, 140, amplifier 154 produces a positive step on conductor 156 when:

$$A \times V_R + B \times V_{RC2} > A \times V_C + B \times V_{RC1}$$

As will be shortly hereinafter explained, a positive step voltage appearing on conductor 156 triggers the firing circuit and detonates cap 44 when the firing circuit is in an armed condition. It can be seen from the foregoing equation that as the value of $V_C$ increases, the sensitivity of the firing circuit decreases, i.e., it takes a greater pulse from bimorph element 42, which is reflected substantially instantaneously in $V_{RC2}$, to produce a positive step voltage on conductor 156. As $V_C$ assumes a smaller value, smaller deformations of the bimorph element produce a pulse sufficient to detonate cap 44.

Since the $A \times V_R$ and $A \times V_C$ parameters remain substantially constant, at least after $V_C$ is selected at the surface by applying a DC voltage to wires 26, 28, the circuit is sensitive to short term changes of the output produced by bimorph element 42, i.e., $V_{RC2}$, relative to the average of its output, i.e., $V_{RC1}$.

A positive step voltage appearing on voltage conductor 156 can cause triggering of SCR 1176, thereby discharging capacitor 92 through the SCR and cap 44, thus detonating the same. However, not all such step voltages on 156 cause detonation of the cap. As will be recalled, for so long as a DC voltage, as previously described, is applied to wires 26, 28, a positive potential on conductor 64 produces a voltage at the base of transistor 166 (via resistors 168, 170) which maintains transistor 166 biased on thus shorting the gate of SCR 176 to its cathode. Regardless of pulses applied to the gate of SCR 176 via conductor 156 and resistor 172, when transistor 166 is on, the required positive potential on the SCR gate relative to its cathode cannot be produced and the SCR cannot therefore be turned on.

As will be recalled, the DC voltage applied to wires 26, 28 at the surface is variable. Examination of the foregoing equation reveals that as $V_C$ decreases, it takes less of a change in $V_{RC2}$, which is essentially the logarithm of the signal produced by element 42, to cause amplifier 154 to produce a positive step voltage. In fact, $V_C$ can be lowered at the surface of the well until amplifier 154 produces the step voltage. This determination can be made at the surface by simply monitoring the current in wire 26 or wire 28. As can be seen in FIG. 2, when the positive step voltage is produced on conductor 156, transistor 162 is turned on because of the positive voltage applied to the base thereof at the junction of resistors 158, 160 relative to its grounded emitter. When the step is produced, transistor 162 turns on, thus drawing additional current through resistor 164, conductors 175, 64 and wires 26, 28. This additional current is observable at the surface through measurement of current in wire 26 or wire 28.

It can be seen by examining the equation that as $V_C$ approaches $V_R$, the sensitivity of the circuit approaches infinity and will be set off in response to the slightest increase in background noise, i.e., increase of $V_{RC2}$. Once a value for $V_C$ is determined which triggers SCR 176, the value can be increased by a preselected amount above the background noise triggering level to define a signal magnitude, which must be produced by bimorph element 42, relative to the background noise to cause triggering of firing circuit 30.

Thus, the sensitivity of the firing circuit can be customized for the conditions at hand such as circuit noise, ambient acoustic signals produced by drilling, construction, trucks, etc. as well as the size of the explosive charges which are used to generate pressure waves in the bore hole.

Once a sensitivity for the firing circuits is selected as described, blaster 12 is actuated thereby simultaneously exploding charge 20 and removing the voltage applied to wires 26, 28. As previously described, a signal on conductor 22 causes the voltage to be so removed; however, it is to be appreciated that the explosion of charge 20 typically severs wires 26, 28 thus assuring removal of the voltage.

When voltage is so removed from wires 26, 28, the positive potential on conductor 64 which biased transistor 166 to an on condition disappears. The transistor thus goes to its off condition, thereby arming SCR 176. When the pressure wave strikes firing circuit 30, a voltage transient is generated by bimorph element 42. The transient is applied to the input of linear amplifier 116 which applies the same via diode 122 and resistor 126 to conductor 118 and via diode 124 and resistor 128 to conductor 120. Because of the time constant of resistor 126 and capacitor 139, a relatively slowly increasing signal is applied to the inverting input of amplifier 154. At the same time, because of the relatively short time constant of resistor 128 and capacitors 150, 152, a relatively rapidly rising signal is applied to the non-inverting input and amplifier 154 quickly produces a positive step on conductor 156. Since transistor 166 is off, the gate of SCR 176 goes positive relative to its cathode, thus triggering the SCR and causing the same to conduct. Capacitor 92 discharges into cap 44 through the SCR thereby detonating the cap and the charge associated with firing circuit 30.

The explosion thus reinforces the pressure wave generated by explosion of charge 20 which continues downwardly from charge 36 with the foregoing pressure wave detection and charge detonation occurring sequentially in substantially the same manner at each firing circuit in the bore hole.

If for some reason, the pressure wave fails to detonate cap 44, thus leaving a live charge suspended in the bore hole, capacitor 92 gradually discharges through the resistance presented by power supply 96. As the capacitor discharges, the value of $V_C$ in the foregoing equation continually decreases until the background voltage, $V_{RC2}$ is sufficient to cause amplifier 154 to produce a positive step on conductor 156, thereby firing SCR 176, as previously described, and detonating cap 44 and the associated explosive charge.

It may be necessary or desirable to deactivate the firing circuits, like firing circuit 30, after the same have been activated by charging the energy storage capacitors, like capacitor 92. For example, in the event of equipment problems or unexpected sources of noise, it would be desirable to deactivate the system. As will be recalled, removal of the direct current voltage on wires 26, 28 arms the firing circuits and detonates each blasting cap in response to a sufficient acoustic wave or in response to background noise as the capacitor discharges. Therefore, the system cannot be deactivated by simply removing the voltage on wires 26, 28.

Deactivation of firing circuit 30, and of each of the other firing circuits, is achieved by applying an alternating current voltage of about 15 volts peak-to-peak to wires 26, 28 at the surface of bore hole 13. Such a voltage is AC coupled via capacitor 70, 72 to conductors 74, 76 and is converted to a DC signal by full wave bridge rectifier 78 with the negative potential appearing on conductor 80 and the positive on conductor 82. With the gate of FET 84 so biased relative to the source, which is conducted to conductor 88, the FET is placed in a nonconducting condition. The positive DC potential conducted via wire 26 or wire 28, which appears on the cathodes of diodes 48, 52, is therefore removed from conductor 88.

With the charging voltage so removed from capacitor 92, the capacitor slowly discharges through power supply 96, i.e., through FET 98, potentiometer 100, and resistor 102. The length of time for the capacitor to so discharge is generally known and after passage of such time, and an additional amount for safety purposes, both the alternating and direct current voltages can be removed from wires 26, 28 without detonating cap 44 since capacitor 92 is discharged. Firing circuit 30 is thus placed in the condition it was in prior to application of any voltages on wires 26, 28.

Figure 3:
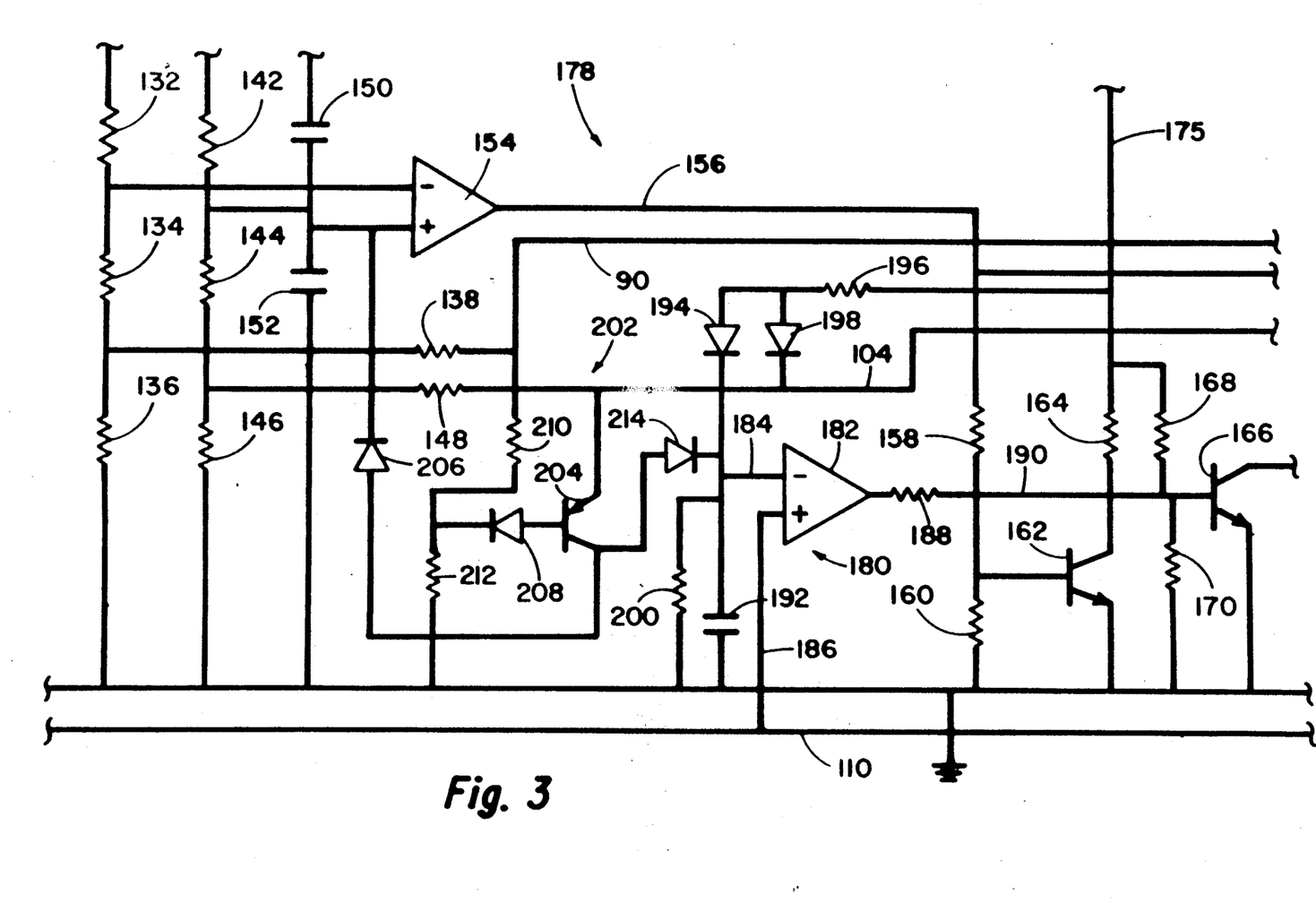
FIG. 3 is a schematic diagram of a portion of a second embodiment of a firing circuit which is associated with each of the charges except for the uppermost charge in FIG. 1.

The Embodiments of FIGS. 1-3

Turning now to FIG. 3, indicated generally at 178 is a portion of a second embodiment of a firing circuit constructed in accordance with the present invention. Firing circuit 178 includes all of the structure previously identified in firing circuit 30 of FIG. 2 as well as additional circuit components which are hereinafter described. Firing circuit 30 is not reproduced in its entirety in FIG. 3. Some components from firing circuit 30 are shown in FIG. 3 for the purpose of indicating the points of connection for additional circuit components in firing circuit 178. The components and conductors which are common to both embodiments and which were previously identified and described in FIG. 2 retain the same numeral in FIG. 3.

Briefly stated, firing circuit 178 works substantially as previously described in connection with the operation of firing circuit 30. There is, however, one significant difference: the firing circuit is armed for only a brief period, i.e., 0.1 to 0.5 seconds, after the surface DC voltage is removed from wires 26, 28. This time period is sufficient for the initial pressure wave generated by detonation of blaster 12 to pass through the formation in which the charges are suspended. There have been cases in which the charges are not triggered by the initial wave, such as in a dry hole where the charge is not in contact with the wall of the hole. The charge may thereafter be triggered by the pressure waves caused by detonation of lower charges thus causing some detonations to occur two to three seconds after the initial pressure wave and thus ruining the seismic recording.

Indicated generally at 180 is a time-delay disarming circuit. Included therein is an operational amplifier or op amp 182 having an inverting input connected to conductor 184 and a noninverting input connected to conductor 186. The output of op amp 182 is tied to the juncture of resistors 168, 170, and the base of transistor 166, via resistor 188 and conductor 190. Conductor 104, as will be recalled, has +15 volts DC applied thereto so long as energy storage capacitor 92 (in FIG. 2) remains charged to at least that level. Conductor 184 is tied to ground via capacitor 192. The other side of the capacitor is tied to the cathode of a diode 194 which has the anode thereof connected to conductor 175 via resistor 196. Conductor 175, as can be seen with reference to FIG. 2, has the positive DC voltage which is applied to the firing circuit via wires 26, 28 from the surface applied thereto. When the DC voltage at the surface is removed, the potential on conductor 175 relative to ground immediately drops to zero.

As will later be more fully understood, diode 194 isolates capacitor 192 from the base of transistor 166 thereby preventing any charge on capacitor 192 from biasing transistor 166 to its "on" condition after the DC voltage at the surface is removed. Another diode 198 prevents the potential on conductor 184, which is connected to the inverting input of op amp 182, from rising above the +15 volts DC supply on conductor 104 thereby preventing damage to the op amp. A resistor 200 is in parallel with capacitor 192 as shown.

Consideration will now be given to the operation of time-delay circuit 180. When DC voltage is applied via wires 26, 28 at the surface, capacitor 192 is charged to a level which maintains the inverting input at a higher potential than the noninverting input. The noninverting input is tied to a consent potential (about 7 ½ volts in the present embodiment) picked off between resistors 100, 102, in FIG. 2, which appears on conductor 110. The output of op amp 1182 is thus at a low level thereby permitting switching of transistor 166 for the purpose of arming and disarming SCR 176 as previously described. When the DC voltage is removed from wire 26, 28 at the surface thereby arming firing circuit 178, capacitor 192 begins to discharge through resistor 200. When such discharge occurs to the extent that the noninverting input is less than the inverting input, the output of the op amp goes to a high voltage level and transistor 166 is turned on thereby shorting the gate of SCR 176 to its anode and preventing detonation if such has not already occurred.

Thus, by selecting appropriate values of resistor 200 and capacitor 192, a discharge time for capacitor 192 is set thus causing firing circuit 178 to resume the disarmed condition at preselected time after the same was initially armed. After being so disarmed, capacitor 92 slowly discharges through power supply 96, i.e., through FET 98, potentiometer 100, and resistor 102.

Although time-delay disarming circuit 180 prevents late detonation of charges which can ruin seismic recording, it may be undesirable to leave unexploded charges in the ground. Indicated generally at 202 is a time-delay rearming circuit. Included therein in is a pnp transistor 204 having its emitter tied to conductor 104 and the collector thereof connected to the anode of a diode 206. The cathode of diode 206 is tied to the noninverting input of op amp 154, previously described in FIG. 2. The base of transistor 204 is connected to the anode of diode a 208 while the cathode of diode 208 is connected to the juncture of resistors 210, 212. Diode 208 protects transistor 204 against excessive reverse-bias emitter voltage. The lower end of resistor 212 is tied to ground while the upper end of resistor 210 is tied to conductor 90 which, as can be seen with reference to FIG. 2, is the potential across energy storage capacitor 92.

Finishing now the description of time-delay rearming circuit 202, a diode 214 has the anode thereof connected to the collector of transistor 204 and the cathode thereof tied to the inverting input of op amp 182.

In operation, assuming firing circuit 178 is associated with a charge which was not detonated by the initial pressure wave, time-delay disarming circuit 180 operates as described above and places firing circuit 178 in a disarmed condition, by turning on transistor 166, 0.1 to 0.5 seconds after detonation of charge 20, depending upon the values for resistor 200 and capacitor 192. As energy storage capacitor 92 begins discharging through power supply 96 as described above, the voltage across resistors 210, 212 falls. When it falls to a preselected level, preferably approximately 0.25× the regulated voltage appearing on conductor 104, transistor 204 turns on. When such occurs, current flows from supply line 104, via transistor 204 and diode 214, thereby recharging capacitor 192. Diode 214 permits such current flow while preventing positive voltage applied to the inverting input of op amp 182 via conductor 175, resistor 196 and diode 194, from being applied to the noninverting input of op amp 154.

When transistor 204 turns on, the supply voltage on conductor 104 is also applied via diode 206 to the noninverting input of op amp 154 thereby causing the output thereof on conductor 156 to go to a high level. A voltage pulse is thus applied (as previously described) to the gate of SCR 176 thereby completing the discharge circuit and causing capacitor 92 to discharge into cap 44 to detonate the charge. Diode 206 also isolates positive voltage appearing on the noninverting input of op amp 154 from the inverting input of op amp 182.

It is to be appreciated that time-delay disarming circuit 180 can be added to firing circuit 30, as shown in FIG. 2, without adding time-delay rearming circuit 202. Addition of time-delay rearming circuit 202 ultimately detonates any unexploded charges remaining in the ground only after sufficient time has passed, under the action of time-delay disarming circuit 180, to permit the desired seismic recording to take place.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A method of geophysical exploration wherein a seismic wave is passed through a bore hole for sequentially detonating a plurality of explosive charges disposed within said bore hole at spaced intervals, and wherein each of said charges is fired by the discharge of a charged capacitor associated therewith, said method comprising the steps of:
   connecting a plurality of electronic switches so as to control the completion of the respective discharge circuits of said capacitors;
   initiating a seismic wave;
   arming the switches substantially simultaneously with the step of initiating the seismic wave;
   causing the seismic wave to successively strike a plurality of electro-acoustic sensors connected respectively to said switches, each of said switches completing its capacitor discharge circuit responsive to a signal generated by its associated sensor; and
   disarming the switches associated with any undetonated charges remaining in the borehole immediately after the seismic wave passes the sensor associated with each undetonated charge.

2. The method of claim 1 wherein said method further comprises the step of rearming said switches a preselected time after the step of disarming the switches.

3. The method of claim 2 wherein said method further comprises the step of detonating said charges after the step of rearming said switches.

4. The method of claim 1 wherein the step of disarming the switches comprises the step of placing said switches in a disarmed condition a preselected time after the step of initiating a seismic wave.

5. The method of claim 4 wherein said method further comprises the step of rearming said switches a preselected time after the step of placing said switches in a disarmed condition.

6. The method of claim 4 wherein the step of placing the switches in a disarmed condition comprises the step of placing each switch in a disarmed condition prior to waves generated by reflections from the initial seismic wave or waves generated by detonation of bore hole charges striking the sensor associated with the switch.

7. The method of claim 6 wherein the step of placing each switch in a disarmed condition comprises the step of placing each switch in a disarmed condition approximately 0.1 to 0.5 seconds after the step of arming the switches.

8. The method of claim 1 wherein said charges are connected to the surface of said foundation via a pair of wires and wherein said method further comprises the steps of severing said wires after the steps of initiating the seismic wave and arming the switches.

9. A method of firing an explosive charge in a formation so as to reinforce a pressure wave passing through said formation, said method comprising the steps of:
   connecting a firing circuit to said charge, said firing circuit having an electro-acoustic sensor for causing charge detonation responsive to a signal generated by said sensor;
   positioning said charge in the formation;
   generating a pressure wave in the formation;
   arming the firing circuit substantially simultaneously with the step of generating the pressure wave; and
   disarming the firing circuit immediately after the pressure wave passes the sensor in the event that the charge fails to detonate.

10. The method of claim 9 wherein said method further comprises the step of rearming the firing circuit a preselected time after the step of disarming the firing circuit.

11. The method of claim 10 wherein said method further comprises the step of detonating said charge after the step of rearming the firing circuit.

12. The method of claim 9 wherein the step of disarming the firing circuit further comprises the step of disarming the firing circuit a preselected time after the step of generating a pressure wave in the formation.

13. The method of claim 12 wherein said method further comprises the step of rearming the firing circuit a preselected time after the step of disarming the firing circuit.

14. The method of claim 12 wherein the step of disarming the firing circuit comprises the step of placing the firing circuit in a disarmed condition prior to waves generated by reflections from the initial seismic wave striking said sensor.

15. The method of claim 14 wherein the step of disarming the firing circuit comprises the step of placing said circuit in a disarmed condition approximately 0.1 to 0.5 seconds after the step of arming the firing circuit.

16. The method of claim 9 wherein said charge is connected to the surface of said formation via a pair of wires and wherein said method further comprises the step of severing said wires after the steps of generating the pressure wave and arming the firing circuits.

17. Apparatus for firing an explosive charge received in a bore hole formed in a formation so as to reinforce a pressure wave passing through said formation, said apparatus in operative condition comprising:

a firing circuit mountable on said charge, said firing circuit having an electro-acoustic sensor for causing charge detonation responsive to a signal generated by said sensor;

means for substantially simultaneously generating a pressure wave in the formation and arming said firing circuit; and means for automatically disarming said firing circuit immediately after a pressure wave so generated passes said sensor.

18. The apparatus of claim 17 wherein said apparatus further comprises means for automatically rearming the firing circuit a preselected time after the pressure wave passes through the formation.

19. The apparatus of claim 18 wherein said apparatus further comprises means for detonating said charge after said firing circuit is so rearmed.

20. The apparatus of claim 17 wherein said means for automatically disarming said firing circuit comprises means for automatically disarming said firing circuit approximately 0.1 to 0.5 seconds after said circuit is armed.

* * * * *

UNITED STATES PATENT AND TRADEMARK OFFICE
CERTIFICATE OF CORRECTION

PATENT NO. : 5,022,485
DATED : June 11, 1991
INVENTOR(S) : Donald K. Mitchell

It is certified that error appears in the above-indentified patent and that said Letters Patent is hereby corrected as shown below:

Column 12, line 35, change "1182" to --182--;

Column 13, line 5, change "2!4" to --214--.

Signed and Sealed this

Eighth Day of June, 1993

Attest:

MICHAEL K. KIRK

Attesting Officer

Acting Commissioner of Patents and Trademarks